United States Patent
Abe (10) Patent No.: US 10,048,694 B2
(45) Date of Patent: Aug. 14, 2018

(54) SELF-PROPELLED DEVICE

(71) Applicant: TOSHIBA LIFESTYLE PRODUCTS & SERVICES CORPORATION, Ome-shi (JP)

(72) Inventor: Kouichi Abe, Owariasahi (JP)

(73) Assignee: TOSHIBA LIFESTYLE PRODUCTS & SERVICES CORPORATION, Ome-shi (JP)

( * ) Notice: Subject to any disclaimer, the term of this patent is extended or adjusted under 35 U.S.C. 154(b) by 15 days.

(21) Appl. No.: 15/109,354

(22) PCT Filed: Jan. 9, 2015

(86) PCT No.: PCT/JP2015/050490
§ 371 (c)(1),
(2) Date: Jun. 30, 2016

(87) PCT Pub. No.: WO2015/105178
PCT Pub. Date: Jul. 16, 2015

(65) Prior Publication Data
US 2016/0324386 A1 Nov. 10, 2016

(30) Foreign Application Priority Data
Jan. 9, 2014 (JP) .................. 2014-002707

(51) Int. Cl.
*G05D 1/02* (2006.01)

(52) U.S. Cl.
CPC ......... *G05D 1/0225* (2013.01); *G05D 1/0242* (2013.01); *A47L 2201/02* (2013.01); *G05D 2201/0215* (2013.01)

(58) Field of Classification Search
CPC ......... G05D 1/0242; G05D 2201/0215; G05D 1/028; G05D 1/0231; G05D 1/027; G05D 1/0248; G05D 1/0244
See application file for complete search history.

(56) References Cited

U.S. PATENT DOCUMENTS 4,679,152 A * 7/1987 Perdue .................. B25J 19/005
180/167
5,165,064 A * 11/1992 Mattaboni ............ G05D 1/0234
356/141.2

(Continued)

FOREIGN PATENT DOCUMENTS

| JP | 6-125861 A | 5/1994 |
| JP | 7-322977 A | 12/1995 |

(Continued)

OTHER PUBLICATIONS

International Search Report dated Feb. 3, 2015 in PCT/JP2015/050490 Filed Jan. 9, 2015.

*Primary Examiner* — Dale Moyer
(74) *Attorney, Agent, or Firm* — Oblon, McClelland, Maier & Neustadt, L.L.P.

(57) ABSTRACT

A vacuum cleaner includes a first transmitting unit transmitting a signal including first identification information with directivity of a predetermined width, and a first receiving unit receiving a signal with directivity wider than directivity of the first transmitting unit. A charger includes a second receiving unit receiving the signal including the first identification information, and a second transmitting unit transmitting a signal including second identification information when the second receiving unit receives the signal including the first identification information. A first control unit controls, when the signal including the second identification information is received by the first receiving unit, drive of a motor to allow a body case to travel based on a direction that the signal including the first identification information is transmitted.

7 Claims, 6 Drawing Sheets

(56) References Cited

U.S. PATENT DOCUMENTS

| | | | |
|---|---|---|---|
| 7,320,149 B1 | 1/2008 | Huffman et al. | |
| 2002/0120364 A1* | 8/2002 | Colens | A47L 11/4005 |
| | | | 700/262 |
| 2004/0111184 A1* | 6/2004 | Chiappetta | G05D 1/0242 |
| | | | 700/245 |
| 2007/0021867 A1* | 1/2007 | Woo | B25J 5/00 |
| | | | 700/245 |
| 2008/0004751 A1* | 1/2008 | Chung | G05D 1/0225 |
| | | | 700/258 |
| 2010/0305752 A1* | 12/2010 | Abramson | G01S 1/70 |
| | | | 700/245 |

FOREIGN PATENT DOCUMENTS

| | | |
|---|---|---|
| JP | 2000-299364 A | 10/2000 |
| JP | 2006-236109 A | 9/2006 |
| JP | 2006-244020 A | 9/2006 |
| JP | 2007-213180 A | 8/2007 |
| JP | 2008-102698 A | 5/2008 |
| JP | 2008-181177 A | 8/2008 |

* cited by examiner

SELF-PROPELLED DEVICE

TECHNICAL FIELD

The present invention relates to a self-propelled device provided with a marker for guiding the position of a traveling element.

BACKGROUND ART

Conventionally, a so-called self-propelled vacuum cleaner (cleaner robot) is known for detecting an obstacle and the like with use of, for example, a sensor and the like while autonomous traveling on the floor surface to be cleaned to clean the floor surface. Such a vacuum cleaner has a driving wheel for travel arranged in the bottom of a body case having a dust collection unit and the like, the driving wheel being driven by a motor actuated with power supplied from a secondary battery housed in the body case, thereby traveling on the floor surface Such the vacuum cleaner is configured to, after cleaning, return to a predetermined charger serving also as a marker guiding a traveling element for charging a secondary battery, where a signal for guiding the vacuum cleaner to the charger is always transmitted from the charger serving also as the marker in a wide transmission range with use of a carrier such as infrared radiation, for example. Thus, the vacuum cleaner located near the charger even at any other time than returning to the charger such as the time while cleaning may not be allowed to receive a signal transmitted from the charger since this signal interferes with another signal transmitted from an external remote controller and the like to the vacuum cleaner.

CITATION LIST

Patent Literature

Patent Literature
PTL 1: Japanese Laid-Open Patent Publication No. 6-125861
PTL 2: Japanese Laid-Open Patent Publication No. 7-322977

SUMMARY OF INVENTION

Technical Problem

The problem to be solved by the invention is to provide a self-propelled device having a marker capable of resisting hindrance of another signal transmitted to a traveling element to a signal from the marker, and of surely guiding the traveling element.

Solution to Problem

In an embodiment, a self-propelled device has a traveling element. Further, the self-propelled device has a marker guiding the traveling element. The traveling element is provided with a body case. Additionally, the traveling element includes a driving wheel rotatably provided in the body case to enable this body case to travel. Moreover, the traveling element is provided with a motor allowing the driving wheel to be rotationally driven. Further, the traveling element is provided with a traveling element-side transmitting unit for transmitting a signal including traveling element-side identification information with directivity of predetermined width. Moreover, the traveling element is provided with a traveling element-side receiving unit capable of receiving a signal with directivity wider than directivity of the traveling element-side transmitting unit. Additionally, the traveling element is provided with a transmission control unit for control the traveling element-side transmitting unit so as to transmit a signal in a plurality of directions. The traveling element is provided with a motor control unit for controlling drive of a motor. The marker is provided with a marker-side receiving unit for receiving the signal including the traveling element-side identification information. Further, e marker is provided with a marker-side transmitting unit for transmitting a signal including marker-side identification information when receiving the signal including the traveling element-side identification information by the marker-side receiving unit. The motor control unit then controls, when the signal including the marker-side identification information is received by the traveling element-side receiving unit, drive of the motor so as to allow the body case to travel based on a direction that the signal including the traveling element-side identification information is transmitted.

DESCRIPTION OF EMBODIMENTS

Hereinafter, description will be given for a structure of a first embodiment with reference to the drawings.

Figure 1A:
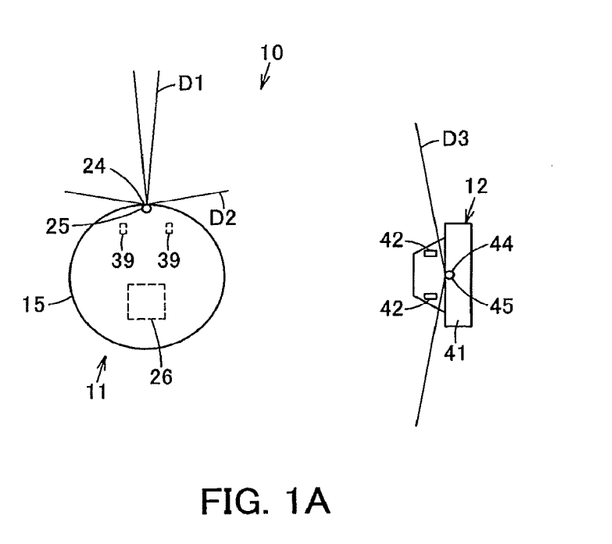
FIG. 1A is a plan view showing a self-propelled device in a first embodiment in which a marker-side receiving unit does not receive a signal from a traveling element-side transmitting unit.
Figure 1B:
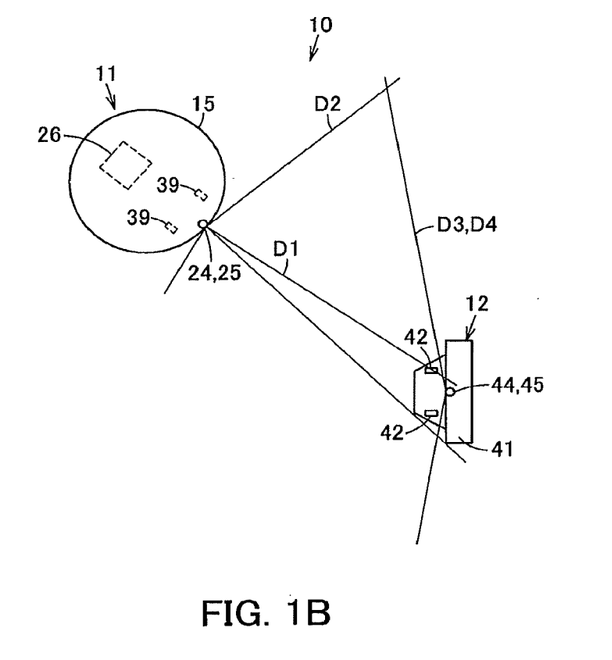
FIG. 1B is a plan view showing the self-propelled device in the first embodiment in which the marker-side receiving unit receives a signal from the traveling element-side transmitting unit.
Figure 2:
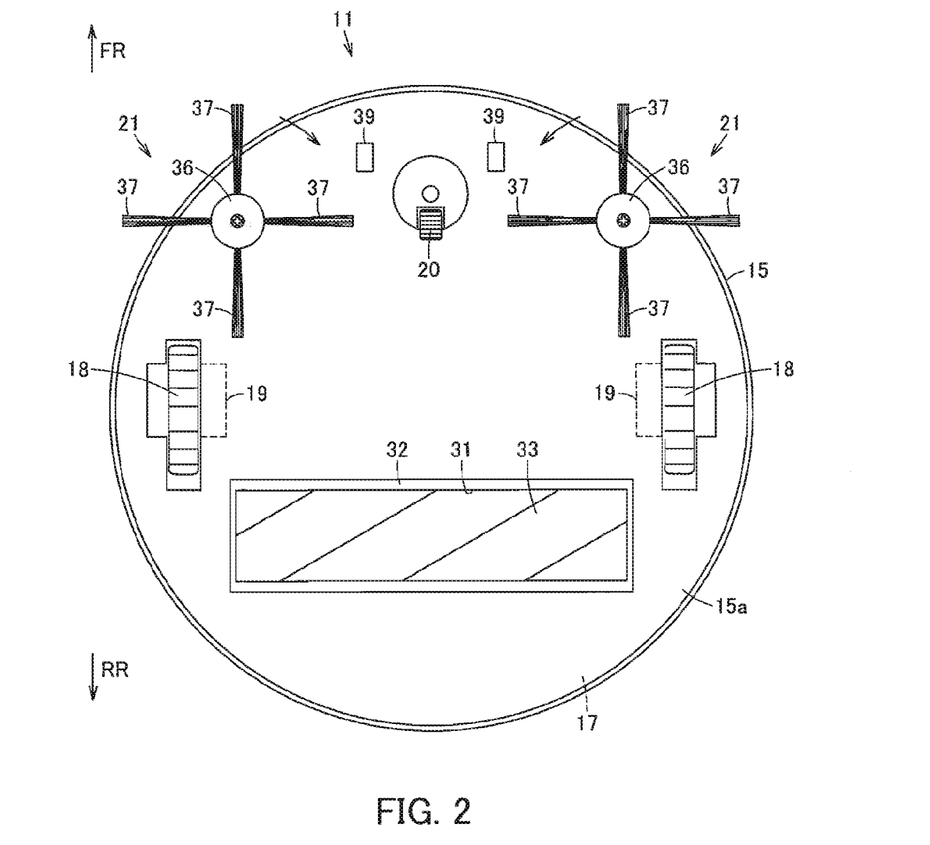
FIG. 2 is a plan view showing from below the same vacuum cleaner as above.
Figure 3:
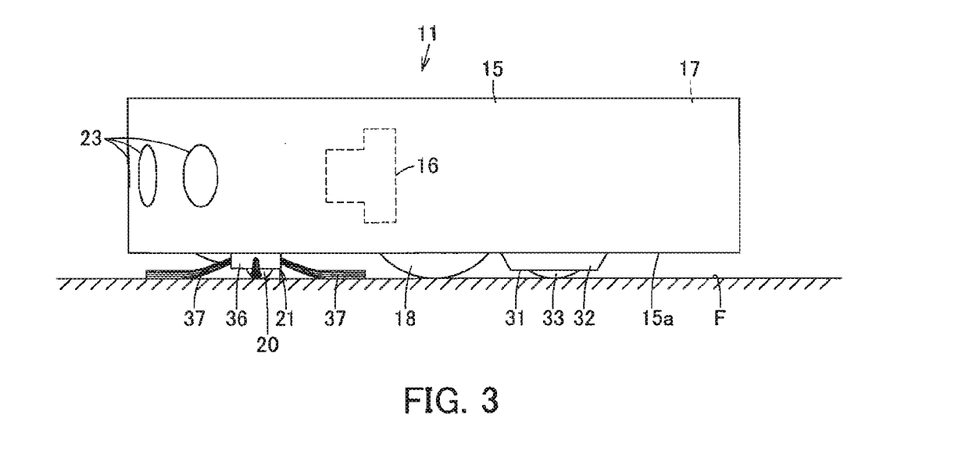
FIG. 3 is a side view of the same vacuum cleaner as above.
Figure 4:
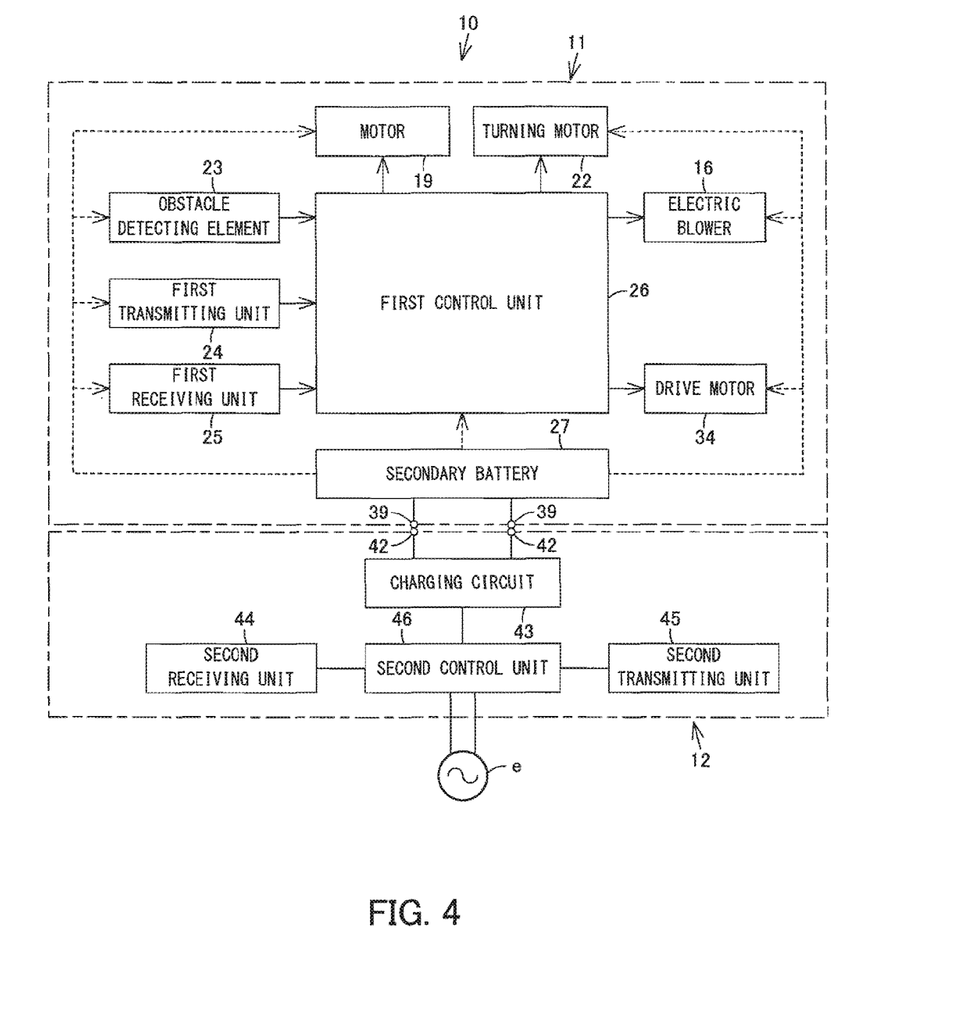
FIG. 4 is a block diagram showing an internal structure of the same vacuum cleaner as above.

In FIGS. 1A, 1B, and 2, a vacuum cleaning apparatus as a self-propelled device is denoted by 10. This vacuum cleaning apparatus 10 is provided with a vacuum cleaner 11 as a traveling element, and a charger 12 as a marker capable of guiding the vacuum cleaner 11.

In the present embodiment, the vacuum cleaner 11 is a so-called self-propelled robot cleaner autonomously traveling (self-propelling) on the floor surface F to be cleaned while cleaning the floor surface F. Further, the vacuum cleaner 11 is provided with a hollow body case 15; an electric blower 16 as an actuating unit housed in the body case 15; a dust collection unit 17 communicating with a suction side of the electric blower 16; a plurality (a pair) of driving wheels 18, for example; a motor 19 as a driving element (driving unit) serving as an actuating unit for driving these driving wheels 18; a turning wheel 20 for turning; side brushes 21 as, for example, a pair of auxiliary cleaning unit (turning cleaning unit) attached to the bottom of the body case 15 so as to allow turning on the floor surface F; a turning motor 22 as a turning driving element (turning driving unit) for driving each of the side brushes 21; an obstacle detecting element (obstacle sensor) 23 for detecting an obstacle such as a wall, furniture and the like; a first transmitting unit (cleaner-side transmitting unit) 24 as a traveling element-side transmitting element (traveling element-side transmitting unit) for transmitting a signal via infrared radiation and the like to the charger 12; a first receiving unit (cleaner-side receiving unit) 25 as a traveling element-side receiving element (traveling element-side receiving unit) for receiving a signal transmitted via infrared radiation and the like from the charger 12, a remote controller (not shown) and the like; a first control unit (cleaner-side control unit) 26 serving as a motor control element (motor control unit) as a transmission control element (transmission control unit) for controlling the drive of the first transmitting unit 24, the first receiving unit 25, the electric blower 16, each motor 19 and the like; and a secondary battery 27 as a battery constituting a power supply unit. It is noted that hereinafter, description will be given assuming that a direction along a traveling direction of the vacuum cleaner 11 (body case 15) is a front-back direction (including arrow FR/PR directions shown in FIG. 2 and the like) and a lateral direction (both sides direction) crossing (orthogonal to) the front-back direction is a width direction.

The body case 15 is formed into a flat columnar shape (disc shape) and the like made by, for example, a synthetic resin and the like, and has a suction opening 31 serving as a dust collection opening communicating with the dust collection unit 17 opened and formed on a circular bottom surface 15a facing the floor surface F. Further, on the top of the body case 15, various operating panels, display units and the like, not shown. In the drawing, are arranged.

The suction opening 31 is formed long wise in the lateral direction, that is, horizontally long, and is opened at a position backward from the center of the bottom surface 15a of the body case 15, and in the center in the lateral direction. The suction opening 31 is surrounded by a nozzle unit 32 having an outer edge protruding from the bottom surface 15a of the body case 15 downward to the floor surface F side. Additionally, the suction opening 31 has a rotary brush 33 rotatably arranged as a rotary cleaning element.

The nozzle unit 32 is formed having opening space so as to be gradually narrowed on the lower side (tip side), a lower end (tip) of which defines the front and the back of the suction opening 31.

The rotary brush 33 is configured in such a way that a plurality of cleaning element units spirally protrude in a wall form in a radial direction to be attached to, for example, an outer periphery of a long shaft. The rotary brush 33 whose lower side protrudes from the suction opening 31 downward to the bottom surface 15a of the body case 15 is configured to allow the tip of the cleaning element unit located on the lower side in a state where the vacuum cleaner 11 is placed on the floor surface F to make contact with the floor surface F. Then, the rotary brush 33 is rotationally driven by a drive motor 34 serving as a rotary cleaning element driving element (rotary cleaning element driving unit).

The drive motor 34 is housed inside the body case 15, and is connected to the rotary brush 33 via a not shown gear mechanism as a mechanism unit.

The electric blower 16 is housed inside the body case 15, for example, having a suction side directed backward and having an axial direction along a front-back direction (horizontal direction), the suction side communicating with the dust collection unit 17. The electric blower 16 may not be needed in the case of being collectable of dust on the floor surface F to the dust collection unit 17 by, for example, rotationally driving the rotary brush 33.

The dust collection unit 17 is provided for collecting dust sucked from the suction opening 31 by driving the electric blower 16, and is located in the back of the body case 15, for example.

Each drive wheel 18 is provided for allowing the body case 15 (vacuum cleaner 11) to travel on the floor surface F (autonomous travel), that is, for travel, and is formed in a flattened disc shape having a not shown rotating shaft along a lateral width direction. Further, these drive wheels 18 are arranged at positions near the center of the front-back direction of the bottom of the body case 15 so as to be apart from one another in a width direction on both sides of the suction opening 31, the positions being symmetrically in the width direction.

Each motor 19 is arranged corresponding to each of the driving wheels 18, for example, so that it is possible to drive each driving wheel 18 independently. These motors 19 maybe directly connected to each driving wheel 18, or may be connected to each driving wheel 18 via a not shown transfer element (transfer unit) such as a gear or a belt.

The turning wheel 20 is located approximately in the center of the width direction of the body case 15, and in the front of, that is, forward from the driving wheel 18. The turning wheel 20 is a driven wheel capable of turning along the floor surface F to turn in a direction of forward movement of the body case 15 by contact with the floor surface F.

Each side brush 21 includes a hub unit 36 which is a cleaning main body as a turning main body, and brush bristles 37 as a plurality of cleaning elements radially protruding in a radial direction from the hub unit 36 to make contact with the floor surface F, respectively. The side brushes 21, 21 are arranged at positions forward from the driving wheels 18, 18 in the bottom of the body case 15, and on both sides backward from the turning wheel 20.

The hub unit 36 has the center part serving as a turning shaft axially supported on the bottom surface 15a of the body case 15 in a turnable manner.

Moreover, each brush bristle 37 is linearly formed of a member such as, for example, a synthetic resin with flexibility (elasticity) The brush bristle 37 radially protrudes from the outside of the hub unit 36 to integrally rotate with the hub unit 36 by rotation (turning) of the hub unit 36, thereby scraping dust off the floor surface F.

Each turning motor 22 has a not shown rotating shaft protruding downward which is connected to each hub unit 36, and can rotate each side brush 21 to the center side in the width direction of the body case 15, in other words, the side brush 21 on the right side to the left side and the side brush 21 on the left side to the right side, that is, so as to scrape and collect dust to the suction opening 31 side with each side brush 21, respectively.

It is noted that the side brush 21 and the turning motor 22 are not essential components.

An obstacle detecting element 23 is a non-contact sensor such as, for example, an ultrasonic sensor, an infrared radiation sensor, or an image sensor. The obstacle detecting element 23 is arranged, for example, covering from the front of an outer perimeter to both sides in the body case 15, thereby making it possible to detect presence or absence of obstacles (wall parts) forward and in a lateral direction of the body case 15, the distance between the obstacles and the body case 15, and the like, respectively.

The first transmitting unit 24 is provided with a light emitting element (light emitting unit) as an originating element (originating unit) such as, for example, an infrared-emitting diode, and an originating directivity setting element (originating directivity setting unit) such as, for example, a lens setting a directional width of the light emitted from the light emitting element. The first transmitting unit 24 is then electrically connected to the first control unit 26 so that, for example, a signal including first identification information (cleaner-side identification information) as a traveling element-side identification information generated by the first control unit 26 can be transmitted forward from the top of the body case 15 with directivity D1 of relatively narrow predetermined width (for example, within an acute angle). The signal including the first identification information is, for example, a signal modulating and superimposing the first identification information to infrared radiation, and the first identification information is so-called ID of the vacuum cleaner 11 indicating that the signal including this information is transmitted from the vacuum cleaner 11. The first transmitting unit 24 only has to be able to transmit a signal forward from the top of the body case 15, and may be not only configured to be entirely arranged on the front side of the top of the body case 15, but also configured in such a way that a part for transmitting a signal (for example, a part of an originating directivity setting element) is only located on the front side of the top of the body case 15 while the other parts are arranged at the other positions of the body case 15.

The first receiving unit 25 is provided with a light receiving element (light receiving unit) such as, for example, phototransistor, a photocoupler and the like, and a receiving directivity setting element (receiving directivity setting unit) such as, for example, a lens setting a directional width of the light received by the light receiving element. The first receiving unit 25 is then electrically connected to the first control unit 26. The first receiving unit 25 is configured to be receivable of, from the front of the top of the body case 15, for example, a signal from the outside with directivity D2 of a width (for example, within an obtuse angle) greater than that of directivity D1 of the first transmitting unit 24, for example, a signal from the charger 12, a signal from a not shown operating element (remote control for operating the vacuum cleaner 11, or the like while outputting the received signal to the first control unit 26. The first receiving unit 25 only has to be able to receive a signal from the front of the top of the body case 15, and may be not only configured to be entirely arranged on the front side of the top of the body case 15, but also configured in such a way that a part for receiving a signal (for example, a part of a receiving directivity setting element) is only located on the front side of the top of the body case 15 while the other parts are arranged at the other positions of the body case 15.

The first control unit 26 is provided with a clocking element (clocking unit) such as, for example, a timer, a memorizing element (memorizing unit) such as a memory, and a control unit main body such as a microcomputer. The first control unit 26 is electrically connected to the electric blower 16, each motor 19, the obstacle detecting element 23, the first transmitting unit 24, the first receiving unit 25, the drive motor 34, and the like, so as to be controllable of drive of the electric blower 16, each motor 19 and the like based on a detection result by the obstacle detecting element 23 and an analysis result of a signal received by the first receiving unit 25.

The secondary battery 27 is provided for supplying power to the first control unit 26, the electric blower 16, each motor 19, the obstacle detecting element 23, the first transmitting unit 24, the first receiving unit 25, the drive motor 34 and the like. The secondary battery 27 is then electrically connected to charging terminals 39, 39 located on, for example, the bottom surface 15a, etc. of the body case 15, and these charging terminals 39, 39 are electrically connected to the charger 12, thereby making it possible to charge the secondary battery 27.

On the other hand, the charger 12 is provided with: a charger main body 41 as a marker main body; connecting terminals 42, 42 provided in the charger main body 41; a charging circuit 43 for charging the secondary battery 27; a second receiving unit (charger-side receiving unit) 44 as a marker-side receiving element (marker-side receiving unit) for receiving a signal transmitted through infrared radiation and the like from the vacuum cleaner 11; a second transmitting unit (charger-side transmitting unit) 45 as a marker-side transmitting element (marker-side transmitting unit) for transmitting a signal through infrared radiation and the like to the vacuum cleaner 11; and a second control unit (charger-side control unit) 46 as a marker-side control element (marker-side control unit) for controlling drive of the second transmitting unit 45 and the like.

The connecting terminals 42, 42 are electrically connected to the charging circuit 43 and are exposed to the outside of the charger main body 41, so as to be mechanically and electrically connectable to the charging terminals 39, 39 of the vacuum cleaner 11.

The charging circuit 43 housed inside the charger main body 41 is a constant current circuit electrically connected to, for example, a commercial alternating-current power e as external power to supply a constant current via the connecting terminals 42, 42 to the secondary battery 27 for charging the secondary battery 27 with the constant current.

The second receiving it 44 is provided with a light receiving element (light receiving unit) such as, for example, a phototransistor, a photocoupler and the like, and a receiving directivity setting element (receiving directivity setting unit) such as, for example, a lens setting a directional width of the light received by the light receiving element. The second receiving unit 44 is then electrically connected to the second control unit 46. The second receiving unit 44 is configured to be receivable of, at a position of the top of the charger main body 41, for example, a signal from the outside with directivity D3 of a width (for example, within an obtuse angle) greater than that of directivity D1 of the first transmitting unit 24, while outputting the received signal to the second control unit 46. The second receiving unit 44 only has to be able to receive a signal from the front of the top of the charger main body 41, and may be not only configured to be entirely arranged on the front side of the top of the body case 15, but also configured in such a way that a part for receiving a signal (for example, a part of the receiving directivity setting element) is only located on the front side of the top of the charger main body 41 while the other parts are arranged at the other positions of the charger main body 41.

The second transmitting unit 45 is provided with a light emitting element (light emitting unit) as an originating element (originating unit) such as, for example, an infrared-emitting diode, and an originating directivity' setting element (originating directivity setting unit) such as, for example, a lens setting a directional width of the light emitted from the light emitting element. The second transmitting unit 45 is then electrically connected to the second control unit 46 in such a way that, for example, a signal including second identification information (charger-side identification information) as marker-side identification information generated by the second control unit 46 can be transmitted in a front direction from the top of the charger main body 41 with directivity D4 of a width (for example, within an obtuse angle) greater than that of directivity D1 of the first transmitting unit 24. The signal including the second identification information is, for example, a signal modulating and superimposing the second identification information to infrared radiation, and the second identification information is so-called ID of the charger 12 indicating that the signal including this information is transmitted from the charger 12. The second transmitting unit 45 and the first transmitting unit 24 are then configured to transmit signals to each other in a time-sharing manner so that these signals can be separated and identified without interference. The second transmitting unit 45 only has to be able to transmit signal forward from the top of the charger main body 41, and may be not only configured to be entirely arranged on the front side of the top of the charger main body 41, but also configured in such a way that a part for transmitting a signal (for example, a part of an originating directivity setting element) is only located on the front side of the top of the charger main body 41 while the other parts are arranged at the other positions of the charger main body 41. Further, directivity D3 of the second receiving unit 44 and directivity D4 of the second transmitting unit 45 may have the same width or different width, and may be wider or narrower than the width of directivity D2 of the first receiving unit 25 of the vacuum cleaner 11.

The second control unit 46 is provided with a clocking element (clocking unit) such as, for example, a timer, a memorizing element (memorizing unit) such as a memory, and a control unit main body such as a microcomputer. The second control unit 46 is electrically connected to the charging circuit 43, the second receiving unit 44, the second transmitting unit 45 and the like, so as to be controllable of drive of the second transmitting unit 45 and the like based on an analysis result of a signal received by the second receiving unit 44.

Figure 5:
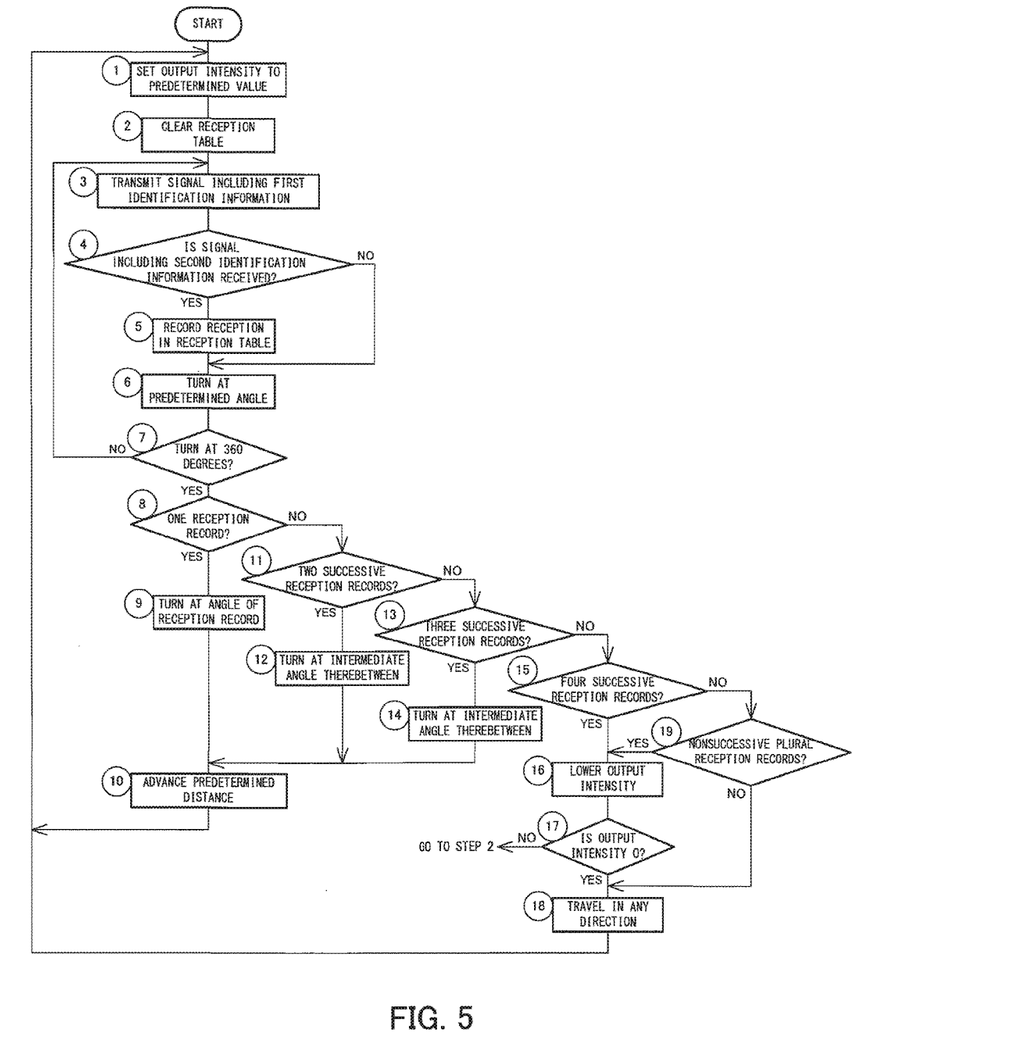
FIG. 5 is a flow chart showing control of the same self-propelled device as above.

Next, description will be given for actuation of the above-described first embodiment also with reference to a flow chart shown in FIG. 5.

In the vacuum cleaner 11, for example, at a predetermined time or the like set in advance in the first control unit 26, the first control unit 26 drives the electric blower 16, each turning motor 22 (each side brush 21) and the drive motor 34 (rotary brush 33) to start cleaning from, for example, the charger 12. A cleaning start position may be set to any place including a travel start position of the vacuum cleaner 11, a doorway of a room or the like.

The vacuum cleaner 11 autonomously travels on the floor surface F with the driving wheels 18, 18 by means of the motors 19, 19 rotationally driven by the first control unit 26. At this time, the first control unit 26 detects the distance to, for example, a wall part surrounding the area to be cleaned, an obstacle within the area to be cleaned and the like via the obstacle detecting element 23, as well as clearance of the bottom of the body case 15 via a not shown step sensor, thereby monitoring the position and a traveling status of the vacuum cleaner 11 to travel on the floor surface F while avoiding over a g an obstacle or climbing over step, corresponding to detection by the obstacle detecting element 23 and the step sensor.

The vacuum cleaner 11 then sucks, with air, dust on the floor surface F scraped and collected by each side brush 21 through the suction opening 31 acting via the dust collection unit 17 with negative pressure generated by driving the electric blower 16, while scraping up the dust to the dust collection unit 17 with the rotary brush 33. The dust is separated and collected by the dust collection unit 17, while the air separated from the dust is sucked into the electric blower 16 and after cooling the electric blower 16, and is exhausted as exhaust air to the outside from a not shown exhaust port provided in the body case 15.

In the case of determining that cleaning of the area to be cleaned is finished, the first control unit 26 causes the vacuum cleaner 11 to autonomously travel to the position of the charger 12. At this time, the first control unit 26 controls drive of the motors 19, 19 to turn the body case 15 by a predetermined angle (spin turn) for changing the direction, while sequentially causing the first transmitting unit 24 to transmit a signal and the first receiving unit 25 to receive a signal in a plurality of directions, so as go around, thereby identifying the direction of the charger 12 relative to the present position of the vacuum cleaner (body case 15) to travel, and causing the body case 15 (vacuum cleaner 11) to travel based on a direction that a signal including the first identification information is transmitted.

Specifically, the first control unit 26 first sets output intensity of a signal (signal level) transmitted from the first transmitting unit 24 to a predetermined value, for example, 3 (step 1).

Then, the first control unit 26 clears a reception table being memorized (step 2) and a signal including the first identification information is transmitted from the first transmitting unit 24 (step 3). Here, the reception table is a table memorizing whether the first receiving unit 25 receives a signal including second identification information transmitted by the second transmitting unit 45 of the charger 12 by a predetermined angle in a predetermined direction, for example, e, on the basis of the front of the vacuum cleaner 11, for example, in a clockwise direction. In the present embodiment, whether a signal is received by the first receiving unit 25 is determined while the vacuum cleaner 11 is turned by 10 degrees clockwise, therefore the reception table is provided as a table independently memorizing a result (numerical value) corresponding to 36 angles of 10 degrees, 20 degrees, . . . , 350 degrees and 360 degrees (0 degree).

The first control unit 26 then determines whether the first receiving unit 25 receives a signal including the second identification information transmitted from the second transmitting unit 45 of the charger 12 (step 4). That is, since the charger 12 transmits the signal including the second identification information from the second transmitting unit 45 only when the second receiving unit 44 receives a signal including the first identification information, determination is made on whether the first receiving unit 25 receives the signal including the second identification information, so that the charger 12 can determine whether the second receiving unit 44 receives the signal including the first identification information, in other words, whether the charger 12 is located in approximately the front of the vacuum cleaner 11 (approximately a transmitting direction of the signal including the first identification information). At this step 4, in the case of determining that the signal is received, the first control unit 26 records that the signal is received as a numerical value, in the reception table corresponding to the present turning angle of the vacuum cleaner 11 (step 5, hereinafter referred to as reception record), and the process goes directly to step 6. At step 4, in a case where the first control unit 26 determines that a signal is not received, the process goes directly to step 6.

Then, the first control unit 26 controls drive of the motors 19, 19 thereby turning the body case 15 in a predetermined direction, for example, rightward (clockwise) at a predetermined angle, for example, 10 degrees (step 6).

Thereafter, the first control unit 26 determines whether the body case 15 turns at 360 degrees (step 7). Then, at this step 7, in a case where the first control unit 26 determines that turning at 360 degrees is not performed, the process returns to step 3. Further, at step 7, in the case of determining that turning at 360 degrees is performed, the first control unit 26 refers to the reception table to determine whether only one turning angle is recorded as a reception record corresponding to each turning angle (step 8). Then, at this step 8, in the case of determining that a reception record is provided only for one turning angle, the first control unit 26 determines that the charger 12 is located in a direction as indicated by the turning angle, and thus causes the body case 15 to turn at the above angle (step 9) for advancing a predetermined distance in the above direction (step 10) thereafter returning to the step 1.

Moreover, at step 8, the first control unit 26 determines, in the case of determining that the reception record is not provided only for one turning angle, whether the reception record is provided for two successive turning angles in the reception table (step 11). At this step 11, in the case of determining that the reception record is provided for two successive turning angles, the first control unit 26 determines that the charger 12 is located in an intermediate direction of directions indicated by the two turning angles, and causes the body case 15 to turn at an intermediate angle between these turning angles (step 12) thereafter going to the step 10.

Further, at step 11, the first control unit 26 determines, in the case of determining that the reception record is not provided for two successive turning angles, whether the reception record is provided for three successive turning angles in the reception table (step 13). At this step 13, the first control unit 26 determines, in the case of determining that the reception record is provided for three successive turning angles, that the charger 12 is located in an intermediate direction of directions as indicated by those turning angles, and therefore causes the body case 15 to turn at an intermediate angle of those turning angles (step 14), thereafter going to step 10.

Moreover, at step 13, the first control unit 26 determines, in the case of determining that the reception record is not provided for three successive turning angles, whether the reception record is provided for four or more successive turning angles in the reception table (step 15) At this step 15, in the case of determining that the reception record is provided for four or more successive turning angles, the first control unit 26 determines that there are possibilities that the second receiving unit 44 of the charger 12 directly receives a signal transmitted from the first transmitting unit 24 of the vacuum cleaner 11 and that the second receiving unit 44 receives the same signal reflected by a wall, an obstacle and the like arranged in the area to be cleaned, thereby decrementing output intensity of the signal transmitted from the first transmitting unit 24, for example, by 1 (step 16). Here, in the case of comparing direct reception by the second receiving unit 44 of the charger 12 of the signal transmitted form the first transmitting unit 24 of the vacuum cleaner 11 to reception by the second receiving unit 44 of the same signal reflected by a wall, an obstacle and the like arranged in the area to be cleaned (indirect reception), reception intensity differs from each other, and the direct reception has greater reception intensity. Thus, the processing at step 16, output intensity of the signal transmitted from the first transmitting unit 24 is lowered, thereby lowering the intensity of the same signal reflected by a wall, an obstacle and the like to the level that the second receiving unit 44 is not receivable of, so that even though the charger 12 is located in a direction different from a direction of the signal transmitted by the first transmitting unit 24 of the vacuum cleaner 11, the same signal reflected by a wall, an obstacle and the like is prevented from being indirectly received by the second receiving unit 44, with the intention to further clarify relative positional relationship between the vacuum cleaner 11 and the charger 12.

Then, the first control unit 26 determines whether output intensity of a signal transmitted from the first transmitting unit 24 is 0 (step 17) At this step 17, in a case where the first control unit 26 determines that the output intensity of the signal is not 0, the process then goes back to step 2. Further, at step 17, in the case of determining that the output intensity of the signal is 0, the first control unit 26 puts specifying of the direction of the charger 12 with respect to the vacuum cleaner 11 on hold temporarily, and causes the body case 15 to travel to any direction (step 18), thereafter going back to step 1.

On the other hand, at step 15, in the case of determining that the reception record is not provided for four or more successive turning angles, determination is made on whether the reception record is present for a plurality of nonsuccessive turning angles in the reception table (step 19). At this step 19, in the case of determining that the reception record is present for a plurality of nonsuccessive turning angles, determination is made that there are possibilities that the second receiving unit 44 of the charger 12 directly receives a signal transmitted from the first transmitting unit 24 of the vacuum cleaner 11 and that the second receiving unit 44 receives the same signal reflected by a wall, an obstacle and the like arranged in the area to be cleaned, and the process goes to step 16. Further, at step 19, in the case of determining that the reception record is not present for a plurality of nonsuccessive turning angles, the process goes to step 18.

In this manner, transmission; reception of a signal and travel are alternately repeated so that the vacuum cleaner 11 returns to the charger 12 so as to gradually approach.

Then, the vacuum cleaner 11 returned to the position of the charger 12 stops the electric blower 16 and the like, while (mechanically and electrically) connecting the charging terminals 39, 39 to the connecting terminals 42, 42 of the charger 12 for stopping the motors 19, 19, and stops working to charge the secondary battery 27.

As described above, according to the above-described first embodiment, the first control unit 26 controls drive of the motors 19, 19 to change the direction of the body case 15 (turn the body case 15), thereby sequentially causing the first transmitting unit 24 to transmit a signal and the first receiving unit 25 to receive a signal, in a plurality of directions. Thus, at least one of each of the first transmitting unit 24 and the first receiving unit 25 is provided, thereby allowing transmission/reception of a signal in a plurality of directions Therefore, it is possible to configure the vacuum cleaner 11 less expensive compared to the configuration with a plurality of the first transmitting units 24 and the first receiving units 25.

In the above-described first embodiment, after the vacuum cleaner 11 travels a predetermined distance based on a signal transmitted from the second transmitting unit 45 of the charger 12, when transmitting the signal from the first transmitting unit 24 again, the signal may not be transmitted from the first transmitting unit 24 at each turning angle of which the body case 15 is turned all around, but may be transmitted by turning the body case 15 only at an angle located in the vicinity of a travel direction of the vacuum cleaner 11 including a travel direction of the vacuum cleaner 11. That is, in a case where the vacuum cleaner 11 is allowed to be traveled for returning to the charger 12, once the vacuum cleaner 1 receives a signal transmitted from the second transmitting unit 45 of the charger 12 to travel, determination is made that the charger 12 is present on the side of the travel direction and is not present on the opposite side and the like. Therefore, the body case 15 is allowed to turn only to the side determined that the charger 12 is present for transmitting the signal from the first transmitting unit 24, thereby omitting unnecessary signal transmission and control of travel (turning) of the body case 15 so that the vacuum cleaner 11 is allowed to return to the charger 12 in a shorter time.

Figure 6:
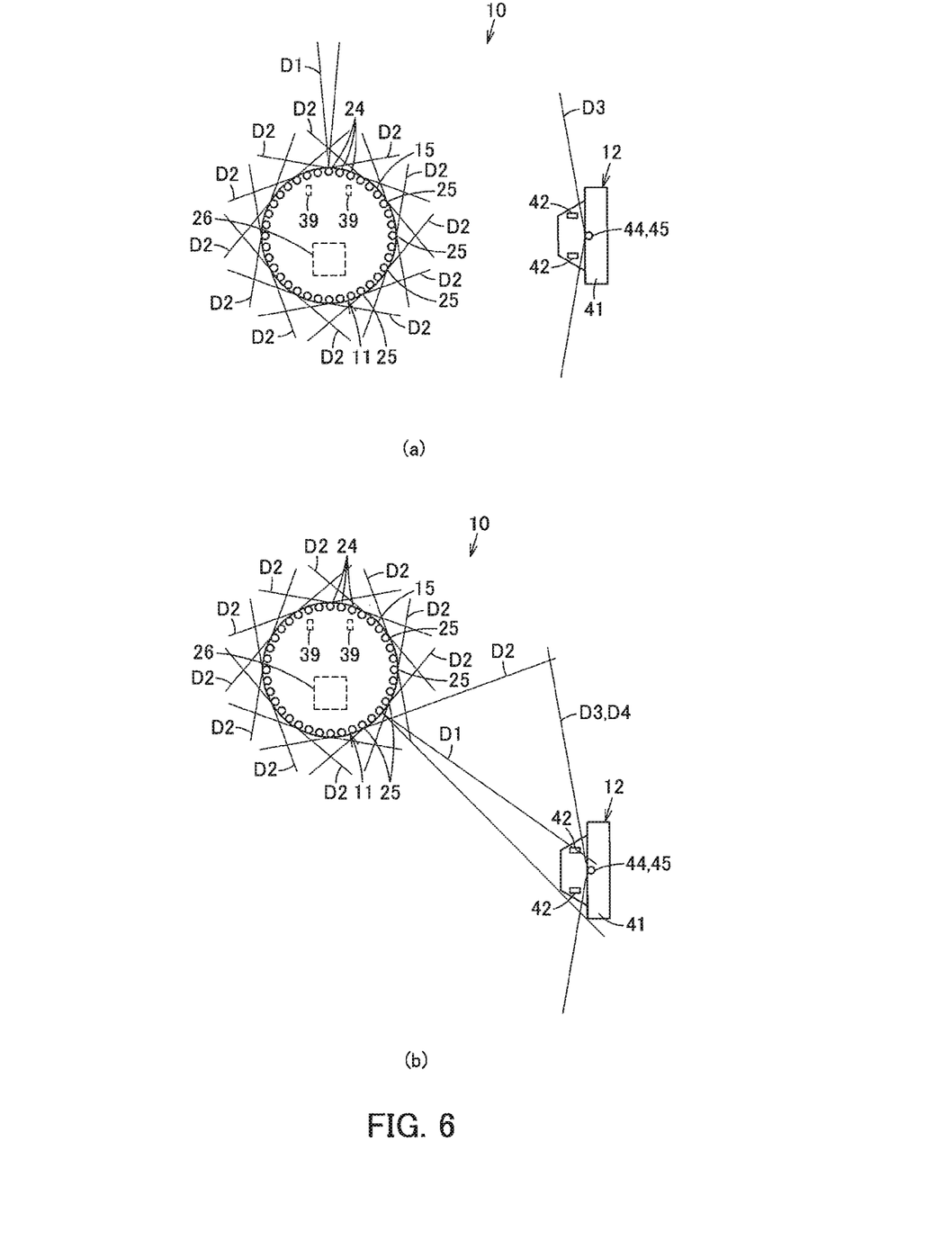
FIG. 6(a) is a plan view showing a self-propelled device in a second embodiment in which the marker-side receiving unit does not receive a signal from the traveling element-side transmitting unit.
FIG. 6(b) is a plan view showing the self-propelled device in the second embodiment in which the marker-side receiving unit receives a signal from the traveling element-side transmitting unit.
Figure 7:
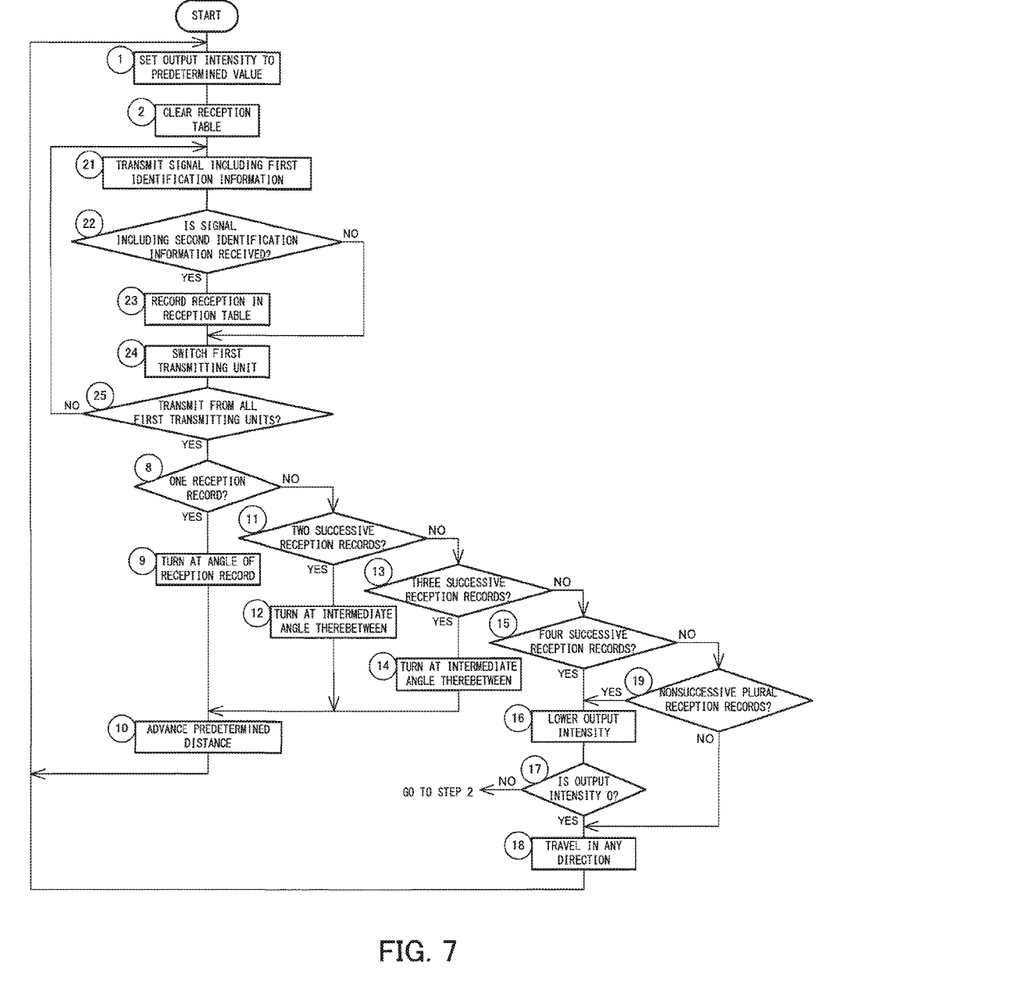
FIG. 7 is a flow chart showing control of the same self-propelled device as above.

Next, description will be given for a second embodiment with reference to FIG. 6 and FIG. 7. It is noted that description will be omitted for a configuration and action similar to those in the first embodiment, giving the same reference signs.

In the second embodiment, a plurality of each of the first transmitting unit 24 and the first receiving unit 25 of the above-described first embodiment are arranged in the body case 15, and the first control unit 26 causes the first transmitting units 24 and the first receiving units 25 to sequentially perform transmission/reception of a signal in a plurality of directions around the body case 15.

The first transmitting unit 24 is allowed to transmit a signal from a circumference of the top of the body case 15, that is, positions spaced from one another by a predetermined angle, for example, by 10 degrees in a circumferential direction.

Further, the first receiving unit 25 is allowed to receive a signal in a circumference of the top of the body case 15, that is, positions spaced from one another by a predetermined angle in a circumferential direction. Here, the first receiving unit 25 may be configured to be receivable of signals from all circumferential direction of the body case 15. That is, the width of directivity D2 of the first receiving unit 25 is greater than that of directivity D1 of the first transmitting unit 24, so that the number of first receiving units 25 to be arranged may be less, compared to the first transmitting unit 24. Therefore, the reception table memorized in the first control unit 26 is set so as to cover each angle of 360 degrees entirely by a plurality of the first receiving units 25.

Further, in the second embodiment, in place of the above-described processing of step 3 to step 7 of the first embodiment, the processing of step 21 to step 25 is performed as below.

That 1s, the first control unit 26 determines that any of the first transmitting units 24 transmits a signal including the first identification information (step 21), and the first receiving unit 25 receives a signal including the second identification information transmitted from the second transmitting unit 45 of the charger 12 (step 22). At this step 22, the first control unit 26 records, in the case of determining that the signal is received, in the reception table corresponding to an angle relative to the front of the vacuum cleaner 11 having the first transmitting unit 24 transmitting the signal (step 23, reception record), and the process goes to step 24. At step 22, in a case where the first control unit 26 determines that the signal is not received, the process goes directly to step 24.

Then, the first control unit 26 switches the first transmitting unit 24 transmitting a signal next, to the adjacent first transmitting unit 24 in a predetermined direction, for example, in a clockwise direction relative to the first transmitting unit 24 transmitting the signal at step 21 (step 24).

Thereafter, the first control unit 26 determines whether the first transmitting unit 24 transmitting a signal returns to the first transmitting unit 24 first transmitting a signal, in other words, whether signals are transmitted from all the first transmitting units 24 (whether the first transmitting unit 24 transmitting a signal goes around) (step 25). Then, at this step 25, in a case where the first control unit 26 determines that signals are not transmitted from all of the first transmitting units 24, the process goes back to step 21. Moreover, at step 25, in a case where the first control unit 26 determines that signals are transmitted from all of the first transmitting units 24, the process goes to step 8.

In this manner, a plurality of each of the first transmitting unit 24 and the first receiving unit 25 are arranged in the body case 15, and the first control unit 26 causes the first transmitting units 24 and the first receiving units 25 to sequentially perform transmission/reception of a signal in a plurality of directions around the body case 15, thereby making it possible to transmit/receive signals to/from a plurality of directions without changing the direction of the body case 15. Therefore, easier control is provided, while it is possible to transmit/receive signals to/from a plurality of directions in a shorter time without requiring time to change the direction of the body case 15, and the like, thus allowing shorter-time returning to the charger 12. Additionally, there is no need for power consumption of the secondary battery 27 required for changing the direction of the body case 15, thereby making it possible to utilize capacity of the secondary battery 27 more effectively for allowing longer-time cleaning.

In the above-described second embodiment, after the vacuum cleaner 11 travels a predetermined distance based on a signal transmitted from the second transmitting unit 45 of the charger 12, when transmitting the signal from the first transmitting unit 24 again, the signal may not be transmitted by all the first transmitting units 24, but be transmitted only by the first transmitting unit 24 located in the vicinity of the travel direction of the vacuum cleaner 11 including the travel direction of the vacuum cleaner 11. That is, in a case where the vacuum cleaner 11 is allowed to travel for returning to the charger 12, once the vacuum cleaner 11 receives a signal transmitted from the second transmitting unit 45 of the charger 12 to travel, determination is made that the charger 12 is present on the side of the travel direction of the vacuum cleaner 11 and is not present on the opposite side and the like. Therefore, the first transmitting unit 24 located on the side determined that the charger 12 is present is only allowed to transmit a signal, thereby omitting unnecessary signal transmission and control so that the vacuum cleaner 11 is allowed to return to the charger 12 in a shorter time.

In each embodiment described above, output intensity of a signal transmitted from the first transmitting unit 24 is lowered, thereby preventing indirect reception of the same signal by the second receiving unit 44, however, it is possible to bring similar effects even in the case of lowering reception sensitivity of a signal received by the second receiving unit 44. It is also possible to bring similar effects even in the case of lowering reception sensitivity of a signal received by the first receiving unit 25 or lowering output intensity of a signal transmitted by the second transmitting unit 45, so as to prevent indirect reception of a signal transmitted from the second transmitting unit 45 by the first receiving unit 25.

Further, each of the transmitting units 24, 45 and the receiving units 25, 44 may transmit/receive a signal with use of a wireless medium such as, for example, ultrasound and a laser beam if other than infrared radiation.

Moreover, the vacuum cleaner 11 basically travels to the side of a direction that a signal received from the second transmitting unit 45, however, only has to have predetermined relationship between a receiving direction and a traveling direction like having a direction at a predetermined angle relative to a receiving direction as the traveling direction, for example, thus not necessarily having the receiving direction coincident with the traveling direction.

Further, application is possible for not only the vacuum cleaning apparatus 10 constituted by the vacuum cleaner 11 and the charger 12 for charging the secondary battery 27 of the vacuum cleaner 11 but also a self-propelled device constituted by any traveling element and a marker for guiding the position of the traveling element. For example, usage is also possible for a self-propelled device for indoor monitoring and the like, in such a way that with use of a traveling element provided with an imaging element (camera), a user gives a command to a marker through a portable terminal or the like from the outside or the like to guide the traveling element to a predetermined position by means of the marker for imaging the position.

Additionally, it is possible to include a transmission control element (transmission control unit) and a motor control element (motor control unit) separately.

According to at least one embodiment described above, since a signal including the first identification information is transmitted by the first transmitting unit 24 of the vacuum cleaner 11 with directivity D1 of a predetermined width, and only when the same signal is received by the second receiving unit 44 of the charger 12, a signal including the second identification information is transmitted by the second transmitting unit 45, a signal transmitted from the second transmitting unit 45 resists hindrance of another signal received from, for example, an operating element (remote controller) and the like received by the first receiving unit 25, compared to continuous transmission of a signal including the second identification information by the second transmitting unit 45. That is, the signal transmitted by the second transmitting unit 45 resists interference of a signal to the vacuum cleaner 11.

Further, when a signal including the second identification information is received by the first receiving unit 25 having directivity D2 of a width greater than that of directivity D1 of the first transmitting unit 24, the first control unit 26 controls drive of the motors 19, 19 so as to allow the body case 15 to travel based on a direction that a signal including the first identification information is transmitted, thereby making it possible for the charger 12 to surely guide the vacuum cleaner 11 so as to allow the vacuum cleaner 11 and the like that, for example, finishes cleaning to surely return to the charger 12.

Moreover, the vacuum cleaner 11 is configured to basically travel in a direction that a signal including the second identification information which is transmitted from the second receiving unit 45 is received, and thus travels less unnecessarily when returning to the charger 12, thereby utilizing the capacity of the secondary battery 27 more effectively, which allows longer cleaning time to be taken.

Additionally, when the first receiving unit 25 receives a signal including the second identification information from a predetermined number or more (four or more) of plural directions, output intensity of the first transmitting unit 24 is lowered, thereby preventing indirect reception of a signal transmitted from the first transmitting unit 24 of the vacuum cleaner 11 by the second receiving unit 44 to make it possible to further clarify relative positional relationship between the vacuum cleaner 11 and the charger 12.

Further, infrared radiation is utilized for the transmitting units 24, 45 and the receiving units 25, 44, thereby making it possible to provide configuration with inexpensive parts, while allowing easy control of directivity D1, D4 of the transmitting units 24, 45. Particularly, for the first transmitting unit 24, it is possible to easily set narrow directivity D1 with use of simple configuration such as a slit.

Moreover, the vacuum cleaning apparatus 10 is provided for making it possible to surely return the vacuum cleaner 11 to the charger 12 in order to charge the secondary battery 27 after finishing cleaning.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A self-propelled device comprising:
a traveling element; and
a marker configured to guide the traveling element, the traveling element including:
a body case;
a driving wheel rotatably provided in the body case to enable the body case to travel;
a motor configured to allow the driving wheel to be rotationally driven;
a traveling element-side transmitting unit configured to transmit a signal including traveling element-side identification information with directivity of a predetermined width;
a traveling element-side receiving unit configured to be receivable of a signal with directivity wider than the directivity of the traveling element-side transmitting unit;
a control unit configured to control transmission of a signal from the traveling element-side transmitting unit, reception of a signal by the traveling element-side receiving unit, and drive of the motor, the marker including:
a marker-side receiving unit configured to receive the signal including the traveling element-side identification information; and
a marker-side transmitting unit configured to transmit a signal including marker-side identification information when receiving the signal including the traveling element-side identification information by the marker-side receiving unit, wherein,
the control unit causes a signal including the traveling element-side identification information to be transmitted sequentially in a plurality of directions, determines whether the signal including the marker-side identification information is received in each direction, decides a direction where the body case to travel based on a direction that the signal including the marker-side identification information is received, and controls drive of the motor to allow the body case to travel to the determined direction.

2. The self-propelled device according to claim 1, wherein the control unit controls drive of the motor to change a direction of the body case, thereby sequentially causing the traveling element-side transmitting unit to transmit a signal and the traveling element-side receiving unit to receive a signal, in a plurality of directions.

3. The self-propelled device according to claim 1, wherein a plurality of each of the traveling element-side transmitting unit and the traveling element-side receiving unit are arranged in the body case, and
the control unit causes the traveling element-side transmitting unit and the traveling element-side receiving unit to sequentially perform transmission/reception of a signal in a plurality of directions around the body case.

4. The self-propelled device according to claim 1, wherein the traveling element is a vacuum cleaner provided with a secondary battery, and
the marker is a charger capable of connecting with the vacuum cleaner to charge the secondary battery of the connected vacuum cleaner.

5. The self-propelled device according to claim 1, wherein in a case directions determined that a signal including the marker-side identification information is received are a predetermined number or less of successive directions, the control unit controls drive of the motor to allow the body case to travel based on a direction that the signal including the traveling element-side identification information is received.

6. The self-propelled device according to claim 1, wherein in a case directions determined that the signal including the marker-side identification information is received are a predetermined number or more of successive directions, the control unit controls so that at least either of output intensity of the traveling element-side transmitting unit or reception sensitivity of the traveling element-side receiving unit is lowered.

7. The self-propelled device according to claim 1, wherein in a case directions determined that a signal including the marker-side identification information is received are a plurality of directions not successive, the control unit controls so that at least either of output intensity of the traveling element-side transmitting unit or reception sensitivity of the traveling element-side receiving unit is lowered.

* * * * *